(12) United States Patent
Gadgil

(10) Patent No.: US 7,984,206 B2
(45) Date of Patent: Jul. 19, 2011

(54) SYSTEM FOR DEBUGGING THROUGHPUT DEFICIENCY IN AN ARCHITECTURE USING ON-CHIP THROUGHPUT COMPUTATIONS

(75) Inventor: Salil Shirish Gadgil, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 358 days.

(21) Appl. No.: 12/187,098

(22) Filed: Aug. 6, 2008

(65) Prior Publication Data

US 2010/0036986 A1 Feb. 11, 2010

(51) Int. Cl.
*G06F 13/00* (2006.01)
*G06F 9/44* (2006.01)

(52) U.S. Cl. ............. 710/34; 710/60; 710/260; 717/124

(58) Field of Classification Search .................... 710/15, 710/18, 29, 33, 34, 60, 260, 262; 713/500, 713/502; 714/733, 734; 717/124, 125, 127, 717/128
See application file for complete search history.

(56) References Cited

U.S. PATENT DOCUMENTS

| | | | | |
|---|---|---|---|---|
| 5,542,076 A * | 7/1996 | Benson et al. | ................ | 710/260 |
| 5,717,932 A * | 2/1998 | Szczepanek et al. | ......... | 710/260 |
| 5,778,194 A * | 7/1998 | McCombs | .................... | 713/600 |
| 5,875,119 A * | 2/1999 | Bauman et al. | .............. | 702/181 |
| 6,105,064 A * | 8/2000 | Davis et al. | ................... | 709/224 |
| 6,415,243 B1 * | 7/2002 | Mann | ........................... | 702/181 |
| 6,487,631 B2 * | 11/2002 | Dickinson et al. | ............ | 711/112 |
| 6,493,655 B1 * | 12/2002 | Fuse | .............................. | 702/186 |
| 6,615,370 B1 * | 9/2003 | Edwards et al. | ................ | 714/45 |
| 6,732,311 B1 * | 5/2004 | Fischer et al. | ................. | 714/737 |
| 6,816,989 B2 * | 11/2004 | Litt | ................................ | 714/724 |
| 7,065,598 B2 * | 6/2006 | Connor et al. | ................ | 710/260 |
| 7,107,362 B2 * | 9/2006 | Wheless et al. | ................. | 710/10 |
| 7,107,632 B2 * | 9/2006 | Huff et al. | .......................... | 4/661 |
| 7,275,191 B2 * | 9/2007 | Adkisson | ...................... | 714/724 |
| 7,434,108 B2 * | 10/2008 | Moyer et al. | ..................... | 714/45 |
| 2002/0026553 A1 * | 2/2002 | Saito | ................................ | 711/1 |
| 2004/0015744 A1 * | 1/2004 | Klotz et al. | ...................... | 714/43 |
| 2004/0019738 A1 * | 1/2004 | Kahn et al. | ...................... | 711/104 |
| 2006/0212263 A1 * | 9/2006 | Koehler et al. | ............... | 702/182 |
| 2007/0028010 A1 * | 2/2007 | Krasnansky | .................... | 710/18 |

* cited by examiner

*Primary Examiner* — Khanh Dang
(74) *Attorney, Agent, or Firm* — Robert D. Marshall, Jr.; W. James Brady; Frederick J. Telecky, Jr.

(57) ABSTRACT

A method, system, and apparatus for debugging throughput deficiency in an architecture using on-chip throughput computations are disclosed. In one embodiment, a system includes a subsystem module of the integrated circuit (e.g., may be a field-programmable gate array), a other subsystem module associated with the subsystem module to execute a specified function of the integrated circuit, an interconnect module comprising a transmission line to associate the subsystem module to the other subsystem module, and a throughput monitor circuit (e.g., may continuously determine the throughput value) located in the integrated circuit and coupled with the interconnect module to measure a throughput value as a specified number of data bits per a specified period of time. The system may include, an interrupt generation circuit located in the integrated circuit and coupled with the throughput monitor circuit to determine whether the throughput value is less than a specified throughput value.

11 Claims, 7 Drawing Sheets

SYSTEM FOR DEBUGGING THROUGHPUT DEFICIENCY IN AN ARCHITECTURE USING ON-CHIP THROUGHPUT COMPUTATIONS

FIELD OF TECHNOLOGY

This disclosure relates generally to an enterprise method, a technical field of software and/or hardware technology and, in one example embodiment, to system for debugging throughput deficiency in an architecture using on-chip throughput computations.

BACKGROUND

A throughput (e.g., a rate of a successful message delivery over a communication channel measured by a number of data bits per second) deficiency may occur in an integrated circuit (e.g., a semiconductor integrated circuit, silicon chip, etc.). The throughput loss may be the result of an architectural constraint and/or a design limitation (e.g., a clock frequency is not sufficient, a bus width may be lower than required, a design of an interconnect hampers throughput, etc.) within the integrated circuit. Thus, an integrated circuit designer may use a process to detect the throughput loss in order to validate a network architecture of the integrated circuit.

The process may include calculating a total number of packets (e.g., a data packet) transferred from a point A to a point B (e.g., a transmission line, a computer bus, etc.) in a software specified time window. However, the software specified time window may provide an erroneous time frame (e.g., a system clock may be change). Also, a software program used for calculation of the throughput may be external to the integrated circuit. A throughput calculation performed by the software program may not include feedback or information regarding lack of throughput in a particular transmission line. Thus, it may not be able to calculate a deficiency of throughout at a particular point in the integrated circuit.

The process may also include receiving a number of packets and/or stripping each packet to obtain an amount of traffic information (e.g., a data of a control information layer). The bits of the amount of traffic information may later be added with the remaining bits from the number of packets in order to determine a total bit value to calculate the throughput. However, this process may consume processor resources. For example, a process of stripping packets requires a certain number of processor cycles which may be an overhead to a processor.

The process may also include dumping a number of packets in a log file and/or then calculating the throughput based on a number of bits in the number of packets per second. The user may be required to review the log file. The log file may contain a threshold number of packets such that the process may be inefficient and/or time consuming. Also, this process may be available during a simulation (e.g., a verification cycle) and/or not available during an actual use of the integrated circuit.

SUMMARY

A method, system, and apparatus to system for debugging throughput deficiency in an architecture using on-chip throughput computations are disclosed. In one aspect, the system includes a subsystem module of the integrated circuit (e.g., may be a field-programmable gate array), another subsystem module associated with the subsystem module to execute a specified function of the integrated circuit, an interconnect module comprising a transmission line to associate the subsystem module to the other subsystem module, and a throughput monitor circuit (e.g., may continuously determine the throughput value) located in the integrated circuit and coupled with the interconnect module to measure a throughput value as a specified number of data bits per a specified period of time.

The system may include an interrupt generation circuit located in the integrated circuit and coupled with the throughput monitor circuit to determine whether the throughput value is less than an a specified throughput value and if the throughput value is less than the specified throughput value communicate an interrupt signal to the subsystem module.

The system may include a interrupt masking module to determine whether a specified number of interrupt signals have been communicated from a particular interrupt generation circuit of a particular subsystem module is greater than a threshold number of allowed interrupt signals. The masking module may generate a masking command to the subsystem module and the other subsystem module to ignore the interrupt signal if the number of interrupt signals is greater than a threshold number of allowed interrupt signals.

The system may also include a register module to perform at least one of configuring a clock period, configuring a number of bits transferred per transfer, configuring a required throughput and configuring an interrupt mask bit. The system may also include interconnections associated with subsystem modules. The throughput may be coupled to the interconnections by coupling points. In addition, the system may include an indicator module to indicate a generation of the interrupt signal. The subsystem module may communicate an indicate command to the indicator module to indicate the generation of the interrupt signal with interface device (e.g., light emitting diode (LED), computer monitor, alarm, buzzer, etc.).

The system may include data bits transferred circuit of the throughput monitor circuit to determine a number of transferred data bits communicated per a data transfer through the interconnect module. The system may also include a number of transfers counter circuit of the throughput monitor circuit to determine a number of data transfers communicated through the interconnect module. The throughput monitor circuit may determine number of data bits as a product of the number of transferred data bits communicated per each of the data transfers and the number of data transfers.

The system may include a clock circuit (e.g., a configurable register) of the throughput monitor circuit to determine a clock period. The system may also include a total number of clocks counter circuit to determine a number of clock pulses (e.g. a clock signal). The specified period of time may be another product of the clock period and the number of clock pulses. The system may also include a required throughput circuit of the interrupt generation circuit to store a set of data bits associated with a determination of the specified throughput value. The register for the required throughput may be different from the time required. The required throughput may be implemented as a separate configuration register.

In another aspect, the method includes communicating a number of data bits between a subsystem module and another system module, configuring a hardware in the integrated circuit to measure a throughput value as determined by the number of data bits per a specified time period, and generating an interrupt signal if the throughput value is less than a specified throughput value.

The method may include masking an interrupt command once a particular link has a throughput deficiency. The method may include also generating a masking command to the subsystem module and the other subsystem module to ignore the interrupt signal if the number of interrupt signals is greater than a threshold number of allowed interrupt signals. The method may include masking interrupts which may not be desired. In addition, the method may include configuring an indicator module with an interface device to generate an indication signal if the interrupt signal is generated. The method may continuously determine the measurement of the throughput value.

The method may include determining a number of transferred data bits communicated per data transfer between the subsystem module and the other subsystem module. The method may also include determining a number of data transfers communicated between the subsystem module and the other subsystem module. The hardware may determine number of data bits as a product of the number of transferred data bits communicated per each of the data transfers and the number of data transfers. The method may include generating a clock pulse with a generated period. The method may also include determining a number of clock pulses. In addition, the method may include determining the specified time period as another product of the generated period and the number of clock pulses.

In yet another aspect, the method includes coupling a throughput monitor with a bus of the integrated circuit between an active component of the integrated circuit and another active component of the integrated circuit, continuously measuring with the throughput monitor a throughput value through the bus between the active component of the integrated circuit and the other active component of the integrated circuit, and generating a signal with the throughput monitor if the throughput value between the active component of the integrated circuit and the other active component of the integrated circuit is below a specified other throughput value.

The method may include communicating the signal to a processor module coupled to the integrated circuit. The method may also include ignoring the signal if a specified number of signals are received from the throughput monitor during a specified period of time.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
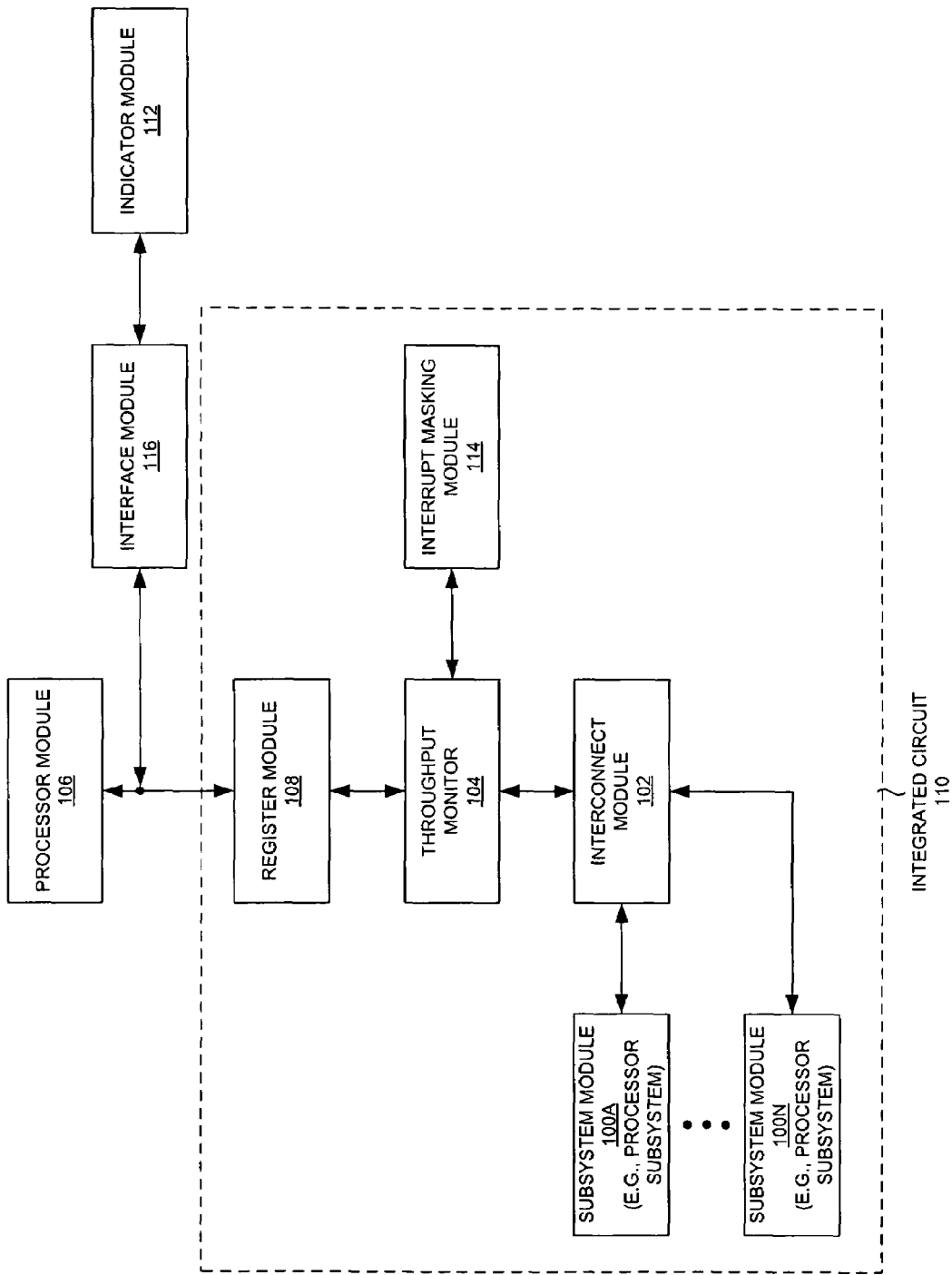
FIG. 1 is a system view of an integrated circuit communicating with the processor module, according to one embodiment.

Other features of the present embodiments will be apparent from the accompanying drawings and from the detailed description that follows.

DETAILED DESCRIPTION

A method, system, and apparatus to system for debugging throughput deficiency in an architecture using on-chip throughput computations are disclosed. Although the present embodiments have been described with reference to specific example embodiments, it will be evident that various modifications and changes may be made to these embodiments without departing from the broader spirit and scope of the various embodiments.

In one embodiment, a system includes a subsystem module (e.g., the subsystem module 100A-N of FIG. 1) of an integrated circuit (e.g., the integrated circuit 110 of FIG. 1) (e.g., may include a field-programmable gate array), another subsystem module associated with the subsystem module 100A-N to execute a specified function of the integrated circuit, an interconnect module including a transmission line (e.g., interconnect) to associate the subsystem module 100A-N to the other subsystem module, and a throughput monitor circuit (e.g., the throughput monitor circuit 304 of FIG. 3) (e.g., may continuously determine the throughput value) located in the integrated circuit 110 and coupled with an interconnect module (e.g., the interconnect module 102 of FIG. 1) to measure a throughput value as a specified number of data bits per a specified period of time.

In another embodiment, a method includes communicating a number of data bits between a subsystem module 100A-N and another subsystem module, configuring a hardware in a integrated circuit (e.g., the integrated circuit 110 of FIG. 1) to measure a throughput value as determined by the number of data bits per a specified time period, and generating an interrupt signal (e.g., the interrupt signal 308 of FIG. 3) if the throughput value is less than a specified throughput value.

In yet another embodiment, a method includes coupling a throughput monitor (e.g., the throughput monitor 104 of FIG. 1) with a bus of an integrated circuit (e.g., the integrated circuit 110 of FIG. 1) between an active component of the integrated circuit and another active component of the integrated circuit, continuously measuring with the throughput monitor 104 a throughput value through the bus between the active component of the integrated circuit and the other active component of the integrated circuit, and generating a signal with the throughput monitor 104 if the throughput value between the active component of the integrated circuit 110 and the other active component of the integrated circuit 110 is below a specified other throughput value.

FIG. 1 is a system view of an integrated circuit communicating with the processor module, according to one embodiment. Particularly, FIG. 1 illustrates a subsystem module 100A-N, an interconnect module 102, a throughput monitor 104, a processor module 106, a register module 108, an integrated circuit 110, and an indicator module 112, according to one embodiment.

The subsystem module 100A-N may be a module (e.g., the processor subsystems) that may have a specific function (e.g., communication, processing signals, etc.) in the integrated circuit 110. The interconnect module 102 may be a module that may enable communication between the modules (e.g., may be between the subsystem module 100A-N, the register module 108, etc.) in the integrated circuit 110. The throughput monitor 104 may be module that may be connected to the communication lines (e.g., between every module) to monitor the throughput (e.g., may be an amount of data transferred in a given time) during communication between any of the modules.

The processor module 106 may be the logic circuitry that may process (e.g., communicate, etc.) the signals (e.g., the interrupt signal, etc.) that for performing a specific task (e.g., servicing interrupt, debugging the lines, communicating the signals to the other systems, etc). The register module 108 may include registers required for throughput computation. The integrated circuit 110 (e.g., may include a field-programmable gate array) may be a miniaturized electronic circuit (e.g., includes semiconductor devices, passive components, throughput monitor, the subsystem, DMA, etc.) that may be constructed on a thin substrate of a semiconductor material. In a specified particular embodiment, the register module may contain the registers to configure the following a) a clock period b) a number of bits transferred per transfer c) a required throughput d) an interrupt mask bit. The indicator module 112 may indicate a signal (e.g., an audio signal, a light signal, an alarm, etc.) that the interrupt signal 308 is generated by the interrupt generation circuit 306.

In example embodiment, the integrated circuit 110 may communicate with the processor module 106 and indicator module 112. The integrated circuit 110 may include the throughput monitor 104 that may monitor the communication lines between the other modules (e.g., like communication lines between the peripheral devices like the subsystem module 100A-N, etc.) through the interconnect (e.g., the interconnect module 102). The throughput monitor 104 may communicate with the register module 108 which may communicate with the processor module 106.

In one embodiment, the integrated circuit 110 may include the subsystem module 100A-N (e.g., may be a field-programmable gate array). The other subsystem module associated with the subsystem module 100A-N may execute a specified function of the integrated circuit 110. The interconnect module 102 may include a transmission line associated with the subsystem module 100A-N to the other subsystem module. The register module 108 may store data bits of a number of interrupt signals from the interrupt generation circuits and algorithmically generate a single interrupt signal and/or communicate the single interrupt signal to the subsystem module 100A-N. The indicator module 112 may indicate a generation of the interrupt signal 308. The subsystem module 100A-N may communicate an indicate command to the indicator module 112 (e.g., light emitting diode (LED), computer monitor, alarm, buzzer, etc.) to indicate the generation of the interrupt signal 308 with an interface device.

The number of data bits may be communicated between a subsystem module 100A-N and another module. The hardware in the integrated circuit 110 may be configured to measure the throughput value as determined by the number of data bits per a specified time period. The indicator module 112 may be configured with an interface device to generate an indication signal if the interrupt signal 308 is generated.

The throughput monitor 104 may be coupled with a bus of the integrated circuit 110 between an active component of the integrated circuit 110 and another active component of the integrated circuit 110. The throughput monitor 104 may continuously measure the throughput value through the bus between the active component of the integrated circuit 110 and the other active component of the integrated circuit 110. The signal may be generated (e.g., the interrupt signal) with the throughput monitor 104 if the throughput value between the active component of the integrated circuit 110 and the other active component of the integrated circuit 110 is below a specified other throughput value. The signal may be ignored (e.g., may be masked using the interrupt masking module 114 of FIG. 1) if the specified number of signals is received from the throughput monitor 104 during a specified period of time.

Figure 2:
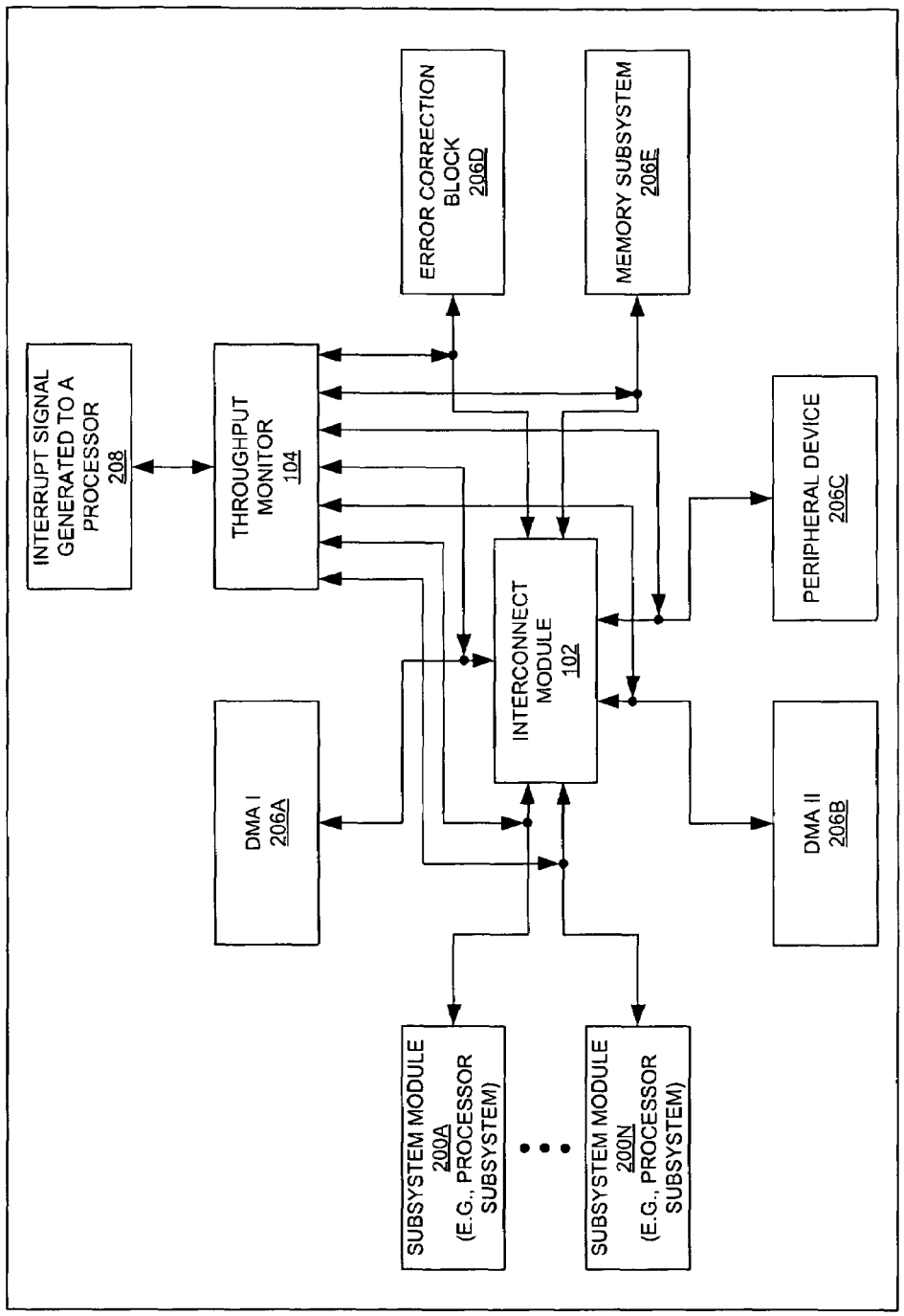
FIG. 2 is a system view illustrating generation of interrupt by a throughput monitor, according to one embodiment.

FIG. 2 is a system view illustrating generation of interrupt by a throughput monitor, according to one embodiment. Particularly, FIG. 2 illustrates a subsystem module 200A-N, a DMA I 206A, a DMA II 206B, a peripheral device 206C, an error correction block 206D, a memory subsystem 206E, and an interrupt generated to a processor 208, according to one embodiment.

The subsystem module 200A-N may be a processor subsystem within the integrated circuit 110, that may communicate the signals (e.g., may be a data signal, a control signal, etc.) to the other devices connected to the interconnect module 102 (e.g., memory device, etc.). The DMA I 206A and the DMA II 206B may enable certain hardware subsystems to access system memory (e.g., without the requirement of the processor) for reading and/or writing independently into the system memory. The DMA I 206A and the DMA II 206B may enable certain hardware subsystems to access data across the peripheral device 206C.

The interrupt generated to a processor 208 may be an interrupt generated by the interrupt generation circuit 306 when there is any variation (e.g., may be lesser than the specified throughput value) in the throughput value compared to a specified throughput value of the throughput monitor 104. The peripheral device 206C may be some device (e.g., the processor subsystem, the processor, the DMA, etc.) in the integrated circuit 110 that may perform specified functions by communicating with other devices. The error correction block 206D may correct the errors (e.g., bugs, wrong signals, incorrect data bits, etc.) that may be received by various devices (e.g., the processor subsystem, DMA etc.) in the integrated circuit 110. The memory subsystem 206E may be a device (e.g., a memory chip, buffer etc.) which may be used to store information (e.g., data, signals, programs, etc.).

In example embodiment, the throughput monitor 104 may monitor throughput from the signal lines (e.g., transmission lines, interconnect, etc.) between the subsystem module 200A-N, the DMA I 206A, DMA II 206B, the peripheral device 206C, an error correction block 206D, and the memory subsystem 206E. The throughput monitor 104 may communicate the interrupt generated (e.g., when the throughput value is not near the specified throughput value) to a processor 208. The throughput monitor 104 may monitor all the communication lines (e.g., may be to check the flow of data) to determine the throughput in each of the communication line (e.g., that may be formed through the interconnect module 102 between two or more modules).

Figure 3:
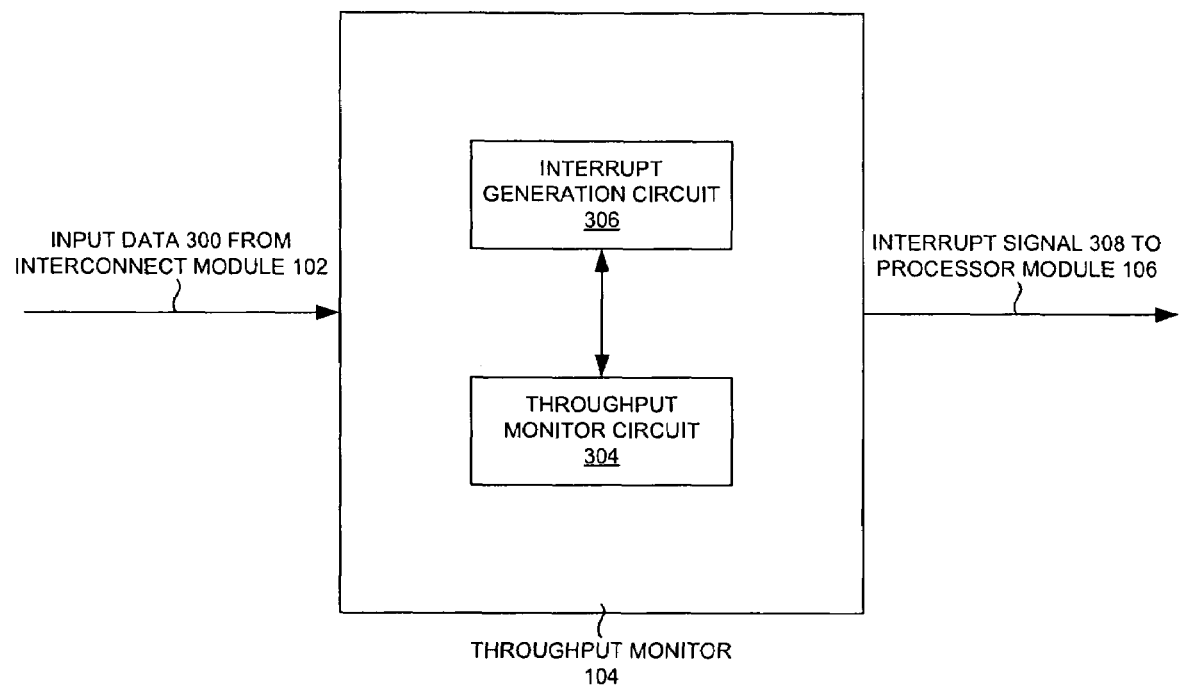
FIG. 3 is an exploded view of throughput monitor illustrated in FIG. 1, according to one embodiment.

FIG. 3 is an exploded view of throughput monitor illustrated in FIG. 1, according to one embodiment. Particularly, FIG. 3 illustrates an input data 300, a throughput monitor circuit 304, an interrupt generation circuit 306, and an interrupt signal 308, according to one embodiment.

The input data 300 may be a measured value of the number of data bits per a specified time period in a transmission line (e.g., interconnect, etc.). The throughput monitor circuit 304 may continuously determine the throughput value (e.g., between the various devices connected to the interconnect module 102 as illustrated in FIG. 2) as a specified number of data bits per a specified period of time. The interrupt generation circuit 306 may generate the interrupt signal 308 and may communicate the interrupt signal 308 to the processor module 106. The interrupt signal 308 may be a signal generated (e.g., when there may be any deficiency in throughput at any transmission line) by the interrupt generation circuit 306.

In example embodiment, the throughput monitor 104 may receive the input data 300 from the interconnect module 102. The throughput monitor circuit 304 may communicate with the interrupt generation circuit 306. The interrupt signal 308 may be communicated to the processor module 106.

In one embodiment, the throughput monitor circuit 304 (e.g., may continuously determine a throughput value) located in the integrated circuit 110 and coupled with the interconnect module 102 may measure the throughput value as a specified number of data bits per a specified period of time. The interrupt generation circuit 306 located in the integrated circuit 110 and coupled with the throughput monitor circuit 304 may determine whether the throughput value is less than a specified throughput value and if the throughput value is less than the specified throughput value, communicate the interrupt signal 308 to the subsystem module 100A-N.

The throughput monitor circuit 304 may determine number of data bits as a product of the number of transferred data bits communicated per each of the data transfers and the number of data transfers. The interrupt signal 308 may be generated if the throughput value is less than a specified throughput value. The signal may be communicated to the processor module 106 coupled to the integrated circuit 110.

Figure 4:
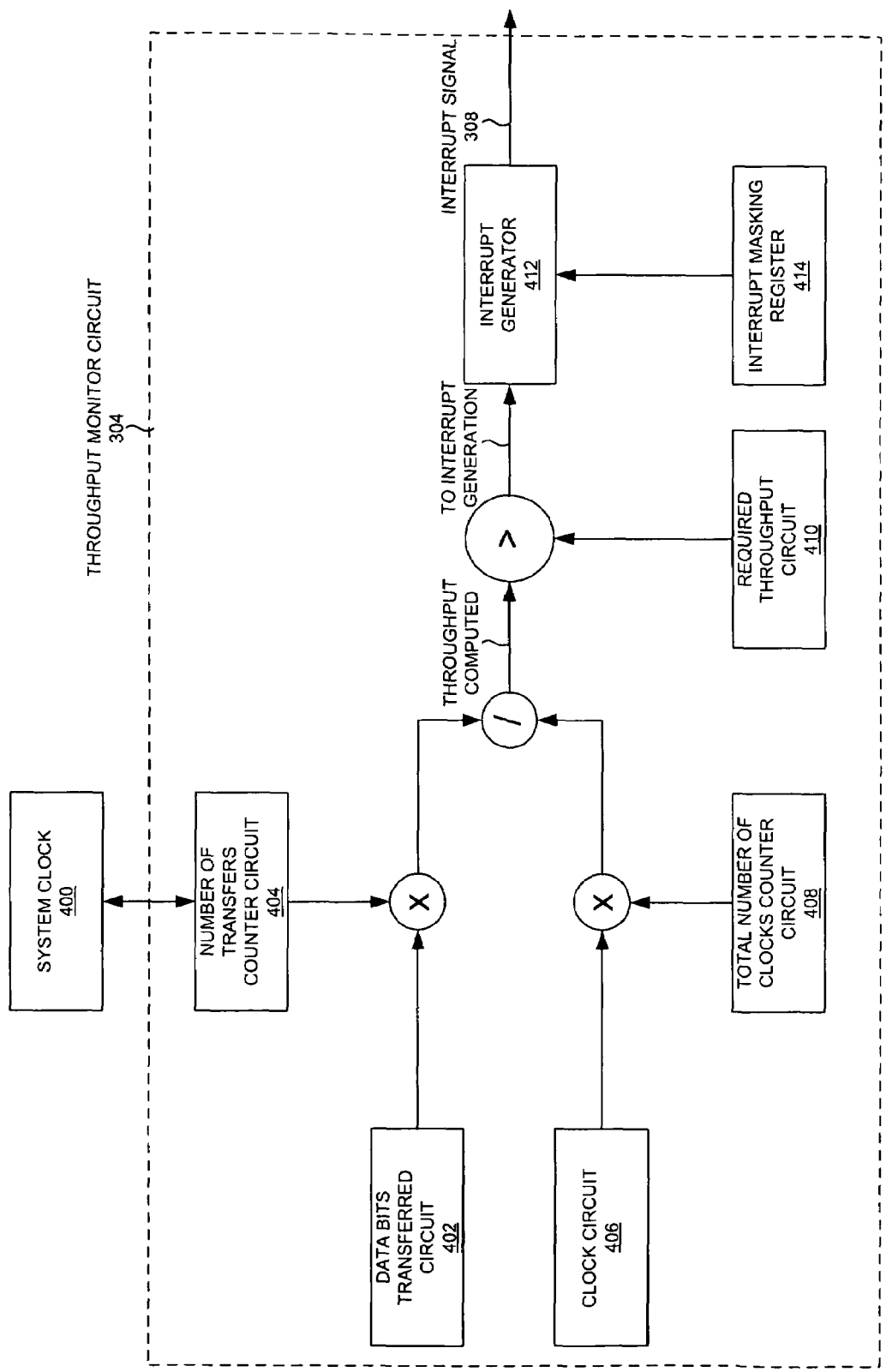
FIG. 4 is an exploded view of throughput monitor circuit illustrated in FIG. 3 connected to system clock, according to one embodiment.

FIG. 4 is an exploded view of throughput monitor circuit illustrated in FIG. 3 connected to system clock, according to one embodiment. Particularly, FIG. 4 illustrates a system clock 400, a data bits transferred circuit 402, a number of transfers counter circuit 404, a clock circuit 406, a total number of clocks counter circuit 408, a required throughput circuit 410, an interrupt generator 412, and interrupt masking register 414, according to one embodiment.

The system clock 400 may be a device (e.g., that may be made of oscillator, crystal quartz, etc.) that may generate a signal (e.g., a clock signal, a clock pulse, etc.) that may be required to enable proper timing in the integrated circuit 110. The data bits transferred circuit 402 (e.g., a register) may determine a number of transferred data bits communicated per a data transfer. The number of transfers counter circuit 404 may determine a number of data transfers communicated through the interconnect module 102. The clock circuit 406 may be a register that may hold data (e.g., may be a clock data which may be generated by the clock in the IC architecture). The total number of clocks counter circuit 408 may determine a number of clock pulses. The clock used by the throughput monitor may be the same clock as used by the IC architecture.

The required throughput circuit 410 may store a set of data bits associated with the specified throughput value. The interrupt generator 412 may be a processing device that may generate interrupts based on the input from the circuitry that determines that may monitor the throughput. The interrupt masking register 414 may be a memory device (e.g., that may be reconfigured) that may include the information that may be required to disable (e.g., mask) certain interrupts (e.g., on purpose) when the user (e.g., may be a designer, architect) does not want the interrupt to reach the processor module 106. The throughput monitor 104 may use a system architecture clock (e.g., the clock that may be used in the IC) as the number of clocks are counted while monitoring the data transfer.

In example embodiment, the throughput may be computed by the dividing the results obtained from the number of transfers counter circuit 404 multiplied with data bits transferred circuit 402 using a multiplier with the clock circuit 406 multiplied by total number of clocks counter circuit 408 using the multiplier. If the throughput computed is less than the required throughput stored in the required throughput circuit 410, then an interrupt may be generated. The interrupt may be generated using the interrupt generator 412. Certain interrupts may be masked (e.g., disabled) that are not required to interrupt the processor module 106 by configuring (e.g., masking) the certain interrupts in the interrupt masking register 414. The FIG. 4 may illustrate the process of throughput determination (e.g., that may include computation) and/or interrupt generation. In one embodiment, the data bits transferred circuit 402 of the throughput monitor circuit 304 may determine a number of transferred data bits communicated per a data transfer through the interconnect module 102. The number of transfers counter circuit 404 of the throughput monitor circuit 304 may determine a number of data transfers communicated through the interconnect module 102. The system clock 400 of the integrated circuit 110 may generate a clock pulse. The clock circuit 406 of the throughput monitor circuit 304 may determine a clock period. The clock period may be a configurable register. In one particular embodiment, a circuit may not be needed to determine the clock period.

The total number of clocks counter circuit 408 may determine a number of clock pulses. The specified period of time may be another product of the clock period and the number of clock pulses. The required throughput circuit 410 of the interrupt generation circuit 306 may store a set of data bits associated with a determination of the specified throughput value.

Figure 5A:
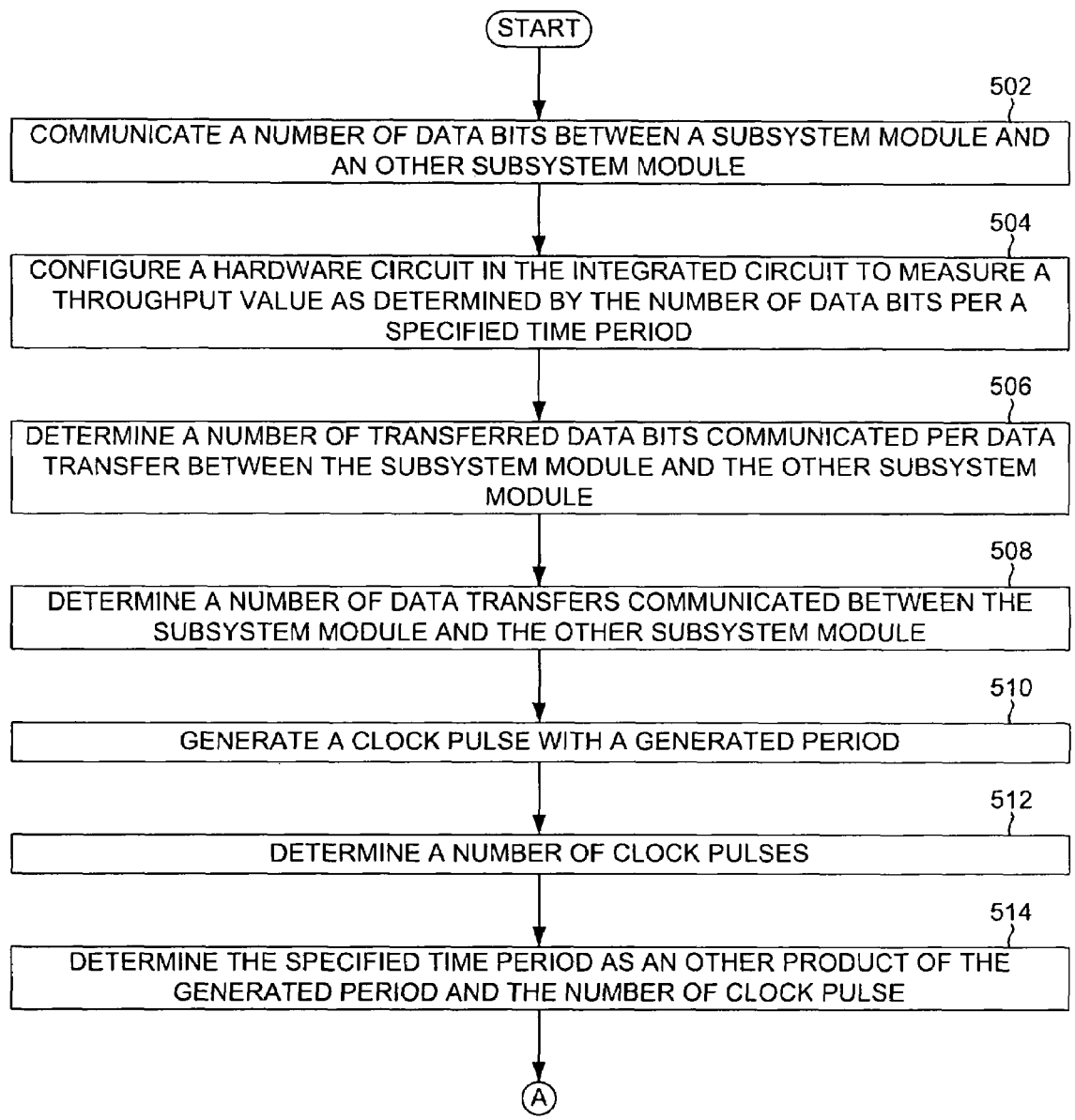
FIG. 5A is a process flow of communicating a number of data bits between subsystem modules, according to one embodiment.

FIG. 5A is a process flow of communicating a number of data bits between subsystem modules, according to one embodiment. In operation 502, a number of data bits may be communicated (e.g., may be through the interconnect module 102 of FIG. 1) between a subsystem module (e.g., the subsystem module 100A-N of FIG. 1) and an other system module. In operation 504, a hardware in the integrated circuit 110 may be configured (e.g., by adding connections on the communication lines) to measure a throughput value (e.g., the throughput value of FIG. 3) as determined by the number of data bits per a specified time period. In operation 506, a number of transferred data bits communicated per data transfer between the subsystem module and the other subsystem module may be determined (e.g., using the throughput monitor 104 of FIG. 1).

In operation 508, a number of data transfers communicated between the subsystem module 100A-N and the other subsystem module may be determined (e.g., using the data bits transferred circuit 402 of FIG. 4). The hardware may determine number of data bits as a product of the number of transferred data bits communicated per each of the data transfers and the number of data transfers. In operation 510, a clock pulse with a specified period may be generated (e.g., using the clock circuit 406 of FIG. 4). In operation 512, a number of clock pulses may be determined. In operation 514, the specified time period may be determined as another product of the specified period and the number of clock pulses.

Figure 5B:
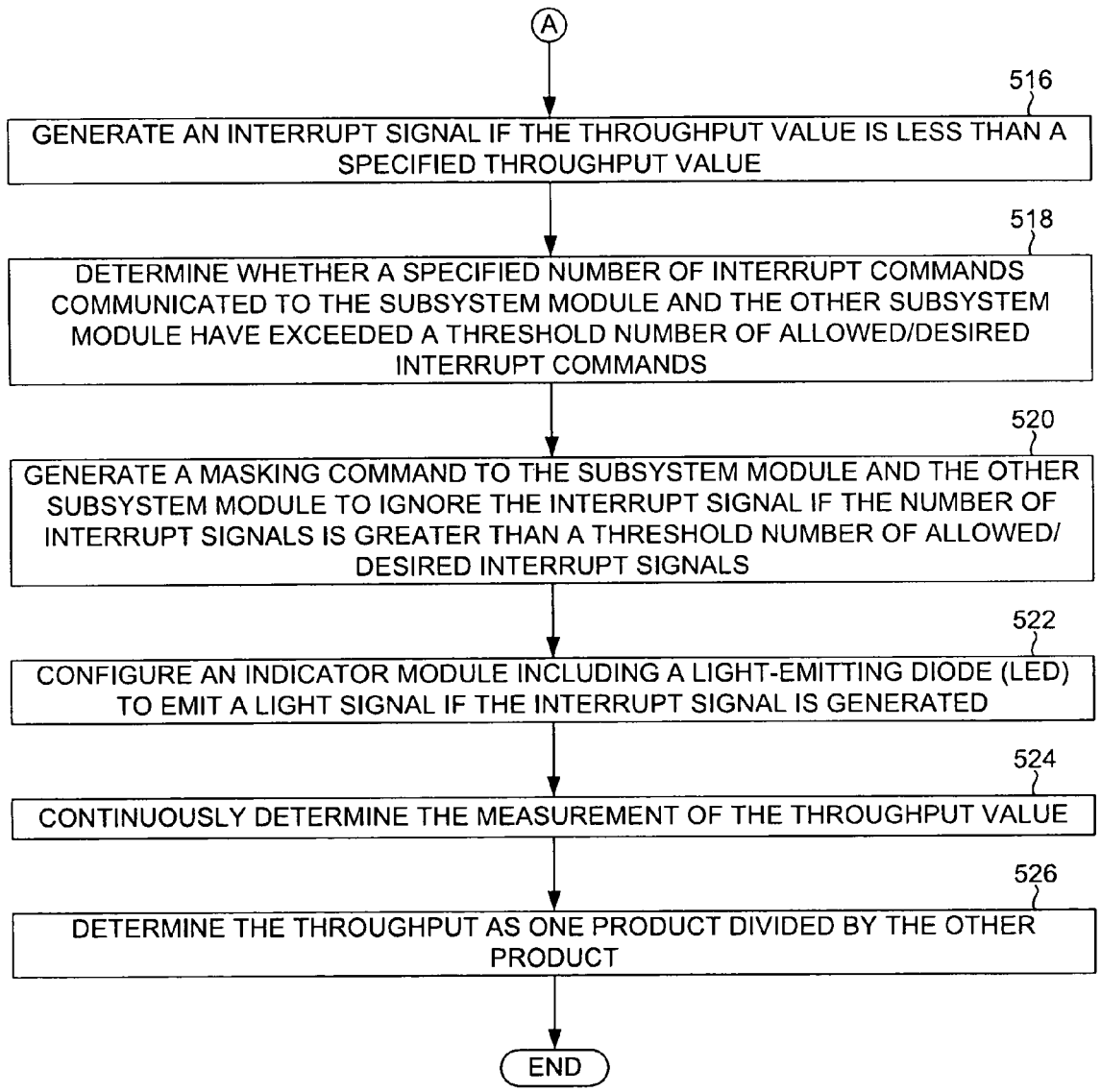
FIG. 5B is a continuation of process flow of FIG. 5A illustrating additional embodiment, according to one embodiment.

FIG. 5B is a continuation of process flow of FIG. 5A illustrating additional embodiment, according to one embodiment. In operation 516, an interrupt signal (e.g., the interrupt signal 308 of FIG. 3) may be generated (e.g., using the interrupt generation circuit 306 of FIG. 3) if the throughput value is less than a specified throughput value. In operation 518, a specified number of interrupt commands communicated to the subsystem module 100A-N and the other subsystem module may be determined (e.g., by using the register module 108 of FIG. 1) to verify whether the specified number of interrupt commands have exceeded a threshold number of allowed/desired interrupt.

In operation 520, a masking command may be generated (e.g., by the interrupt masking module 114 of FIG. 1) to the subsystem module 100A-N and the other subsystem module to ignore the interrupt signal 308 if the number of interrupt signals is greater than a threshold number of allowed interrupt signals. In operation 522, an indicator module (e.g., the indicator module 112 of FIG. 1) with an interface device may generate an indication signal (e.g., a light signal, sound signal, an alarm, etc.) if the interrupt signal 308 is generated. In operation 524, the measurement of the throughput value may be continuously determined (e.g., using the throughput monitor 104 of FIG. 1). In operation 526, the throughput may be determined as one product divided by the other product.

Figure 6:
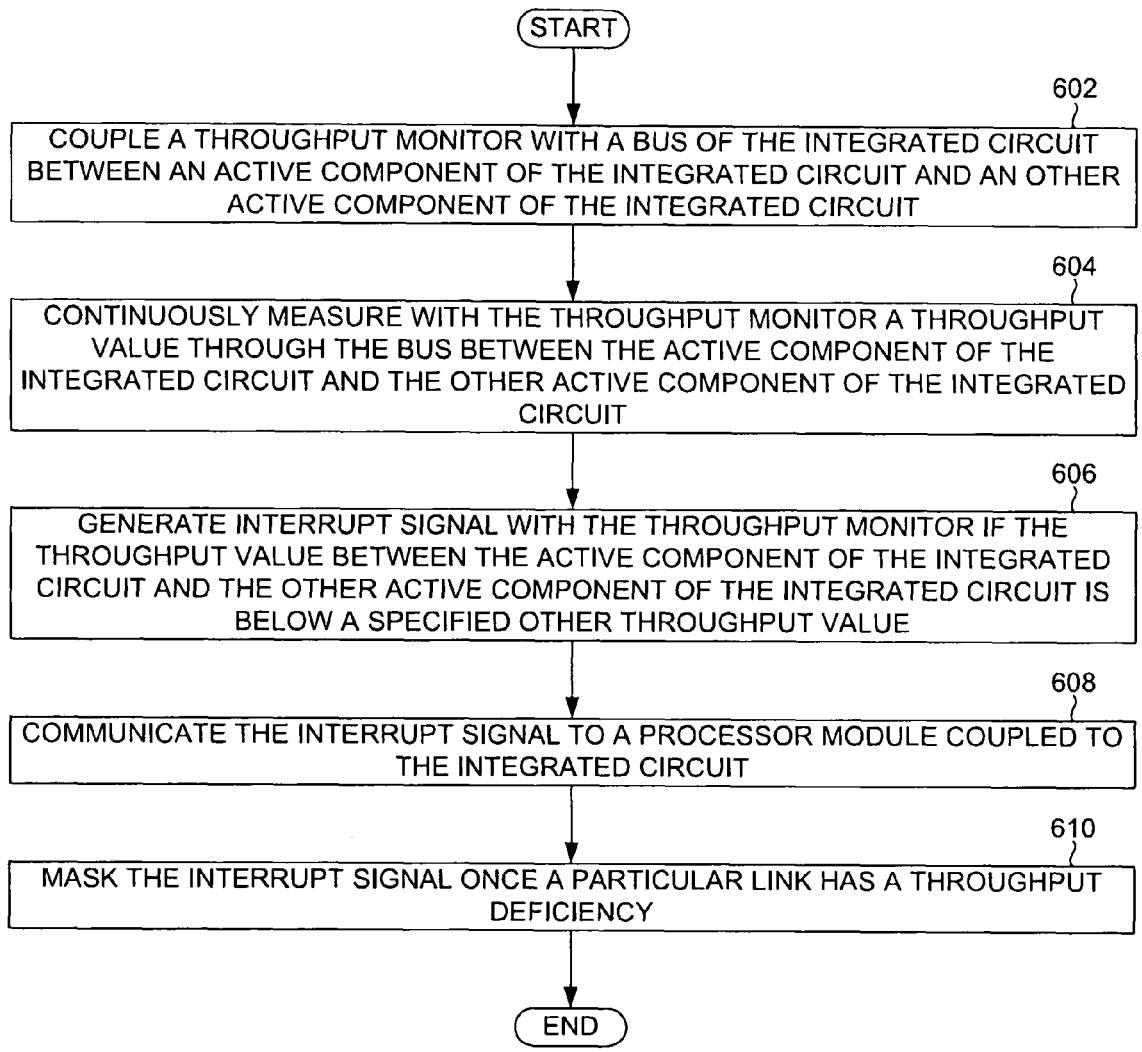
FIG. 6 is a process flow illustrating the measurement of throughput value with the throughput monitor and generating the interrupt signal to a processor component, according to one embodiment.

FIG. 6 is a process flow illustrating the measurement of throughput value with the throughput monitor 104 and generating an interrupt signal to a processor component, according to one embodiment.

In operation 602, a throughput monitor (e.g., the throughput monitor 104 of FIG. 1) may be coupled with a bus of the integrated circuit 110 between an active component of the integrated circuit 110 and another active component of the integrated circuit 110. In operation 604, the throughput monitor 104 may be continuously measured (e.g., using the throughput monitor 104 of FIG. 1) with a throughput value (e.g., the throughput value of FIG. 3) through the bus (e.g., the interconnect, etc.) between the active component of the integrated circuit 110 and the other active component of the integrated circuit 110.

In operation 606, a signal with the throughput monitor 104 may be generated (e.g., using the interrupt generation circuit 306 of FIG. 3) if the throughput value between the active component of the integrated circuit 110 and the other active component of the integrated circuit 110 is below a specified other throughput value. In operation 608, the signal may be communicated (e.g., using the throughput monitor 104 of FIG. 1) to generate an interrupt signal (e.g., the interrupt signal 308 of FIG. 3) to a processor module 106 coupled to the integrated circuit 110 (e.g., as illustrated in FIG. 3). In operation 610, any further signals from the throughput monitor may be ignored (e.g., using the interrupt masking module 114 of FIG. 1) after the signal has been received from the throughput monitor 104. Thus, any further signals may be stopped from unnecessarily consuming processing power.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the subsystem module 100A-N, the interconnect module 102, the processor module 106, the register module 108, the indicator module 112, the interrupt masking module 114, the interface module 116 and other modules may be enabled using software and/or using transistors, logic gates, and electrical circuits (e.g., application specific integrated ASIC circuitry) such as, a processor subsystem circuit, a interconnect circuit, a register circuit, a processor circuit, an indicator circuit, an interrupt generator circuit, the interrupt masking register circuit and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system of an integrated circuit comprising:
a subsystem module of the integrated circuit;
another subsystem module associated with the subsystem module to execute a specified function of the integrated circuit;
an interconnect module comprising a transmission line to associate the subsystem module to the other subsystem module;
a throughput monitor circuit located in the integrated circuit and coupled with the interconnect module to measure a throughput value as a specified number of data bits per a specified period of time; and
an interrupt generation circuit coupled with the throughput monitor circuit to determine whether the throughput value is less than a specified throughput value and if the throughput value is less than the specified throughput value communicate an interrupt signal to the subsystem module.

2. The system of claim 1 further comprising:
an interrupt masking module to determine whether a specified number of interrupt signals has been communicated from a particular interrupt generation circuit of a particular subsystem module is greater than a threshold number of allowed interrupt signals, said interrupt masking module generating a masking command to at least one of the subsystem module and the other subsystem module to ignore the interrupt signal if a number of interrupt signals is greater than a threshold number of allowed interrupt signals;
a register module to perform at least one of configuring a clock period, configuring a number of bits transferred per transfer, configuring a required throughput and configuring an interrupt mask bit;
further comprising a plurality of interconnections associated with a plurality of subsystem modules; and
wherein the throughput is coupled to the plurality of interconnections by a plurality of coupling points.

3. The system of claim 2:
further comprising an indicator module to indicate a generation of the interrupt signal;
wherein the integrated circuit is a field-programmable gate array; and
wherein the subsystem module communicates an indicate command to the indicator module to indicate the generation of the interrupt signal with an interface device.

4. The system of claim 1 further comprising:
a data bits transferred circuit of the throughput monitor circuit to determine a number of transferred data bits communicated per a data transfer through the interconnect module;
a number of transfers counter circuit of the throughput monitor circuit to determine a number of data transfers communicated through the interconnect module; and wherein the throughput monitor circuit determines number of data bits as a product of the number of transferred data bits communicated per each of the data transfers and the number of data transfers.

5. The system of claim 1 further comprising:
a system clock of the integrated circuit to generate a clock pulse;
a clock circuit of the throughput monitor circuit to determine a clock period;
a total number of clocks counter circuit to determine a number of clock pulses; and
wherein the specified period of time is another product of the clock period and the number of clock pulses.

6. The system of claim 5 further including a required throughput circuit of the interrupt generation circuit to store a set of data bits associated with a determination of the specified throughput value.

7. A method of an integrated circuit comprising:
communicating a number of data bits between a subsystem module and another system module;
configuring a hardware in the integrated circuit to measure a throughput value as determined by the number of data bits per a specified time period; and
generating an interrupt signal if the throughput value is less than a specified throughput value.

8. The method of claim 7 further comprising masking an interrupt command once a particular link has a throughput deficiency.

9. The method claim 7 further comprising:
determining a number of transferred data bits communicated per data transfer between at least one of the subsystem module and another subsystem module;
determining a number of data transfers communicated between at least one of the subsystem module and the other subsystem module; and
wherein the hardware determines the number of data bits as a product of the number of transferred data bits communicated per each of the data transfers and the number of data transfers.

10. The method of claim 9 further comprising:
generating a clock pulse with a generated period;
determining a number of clock pulses; and
determining the specified time period as another product of the generated period and the number of clock pulses.

11. A method of an integrated circuit comprising:
coupling a throughput monitor with a bus of the integrated circuit between an active component of the integrated circuit and another active component of the integrated circuit;
continuously measuring with the throughput monitor a throughput value through the bus between the active component of the integrated circuit and the other active component of the integrated circuit as determined by the number of data bits per a specified time period; and
generating a signal with the throughput monitor if the throughput value between the active component of the integrated circuit and the other active component of the integrated circuit is below a specified other throughput value.

* * * * *